United States Patent

Hulten

[11] Patent Number: 5,832,862
[45] Date of Patent: Nov. 10, 1998

[54] AMPHIBIOUS VEHICLE

[76] Inventor: Richard E. Hulten, 4139 Sunburst Ave., Waterford, Mich. 48329-2370

[21] Appl. No.: 919,880

[22] Filed: Aug. 28, 1997

[51] Int. Cl.⁶ .................................................... B63B 35/00
[52] U.S. Cl. ........................................... 114/270; 114/361
[58] Field of Search .................................... 114/270, 343, 114/344, 361

[56] References Cited

U.S. PATENT DOCUMENTS

| | | | |
|---|---|---|---|
| D. 198,067 | 4/1964 | Brill .......................................... D71/1 |
| D. 231,204 | 4/1974 | Gardiner .................................... D12/3 |
| D. 305,414 | 1/1990 | Costello ..................................... D12/3 |
| 2,947,277 | 8/1960 | Stevens ..................................... 114/361 |
| 3,213,821 | 10/1965 | Godwin ....................................... 115/1 |
| 3,362,373 | 1/1968 | Mycroft ..................................... 114/270 |
| 3,765,368 | 10/1973 | Asbeck ..................................... 115/1 A |
| 3,785,325 | 1/1974 | Mycroft ................................... 115/1 R |
| 3,885,693 | 5/1975 | Haptonstall ............................. 214/516 |
| 4,241,686 | 12/1980 | Westphalen ................................. 440/59 |
| 4,607,562 | 8/1986 | LeBlanc ................................. 89/40.03 |
| 4,690,204 | 9/1987 | Reichel et al. ............................. 165/44 |
| 4,723,594 | 2/1988 | Koehr et al. .............................. 165/44 |
| 4,995,447 | 2/1991 | Weidmann et al. ....................... 165/44 |
| 5,046,550 | 9/1991 | Boll et al. .................................. 165/41 |
| 5,195,445 | 3/1993 | Riddles et al. ........................... 114/361 |
| 5,343,973 | 9/1994 | Lanker ................................... 180/211 |
| 5,417,177 | 5/1995 | Taguchi et al. .......................... 114/270 |

*Primary Examiner*—Stephen Avila
*Attorney, Agent, or Firm*—Howard & Howard

[57] ABSTRACT

An amphibious vehicle with a watertight body and including a deck extending rearwardly from the occupant compartment to a rear end. The vehicle is characterized by the occupant compartment including an L-shaped hatch having a top leg forming a portion of the top of the vehicle and a rear leg forming the rear of the occupant compartment in the closed position. The hatch is hinged to the top for movement between an open and closed position. The rear leg includes a rear window for use when the hatch is closed during land operation and the top leg includes a water windshield for use when the hatch is open during marine operation. In the open position, the rear leg is disposed horizontally above the deck forming a roof over the deck with the top leg disposed at an angle extending downwardly from the rear leg to the top of the vehicle.

25 Claims, 8 Drawing Sheets

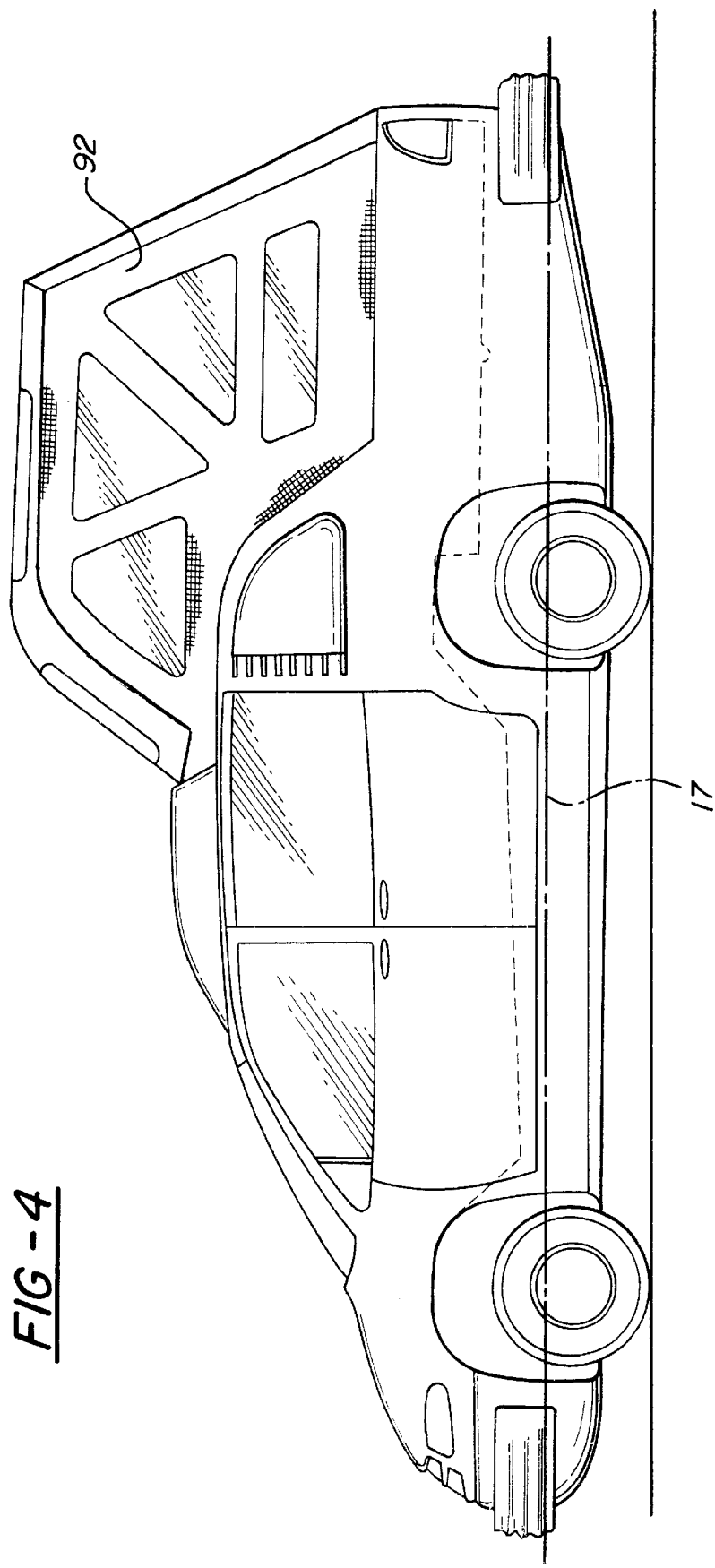

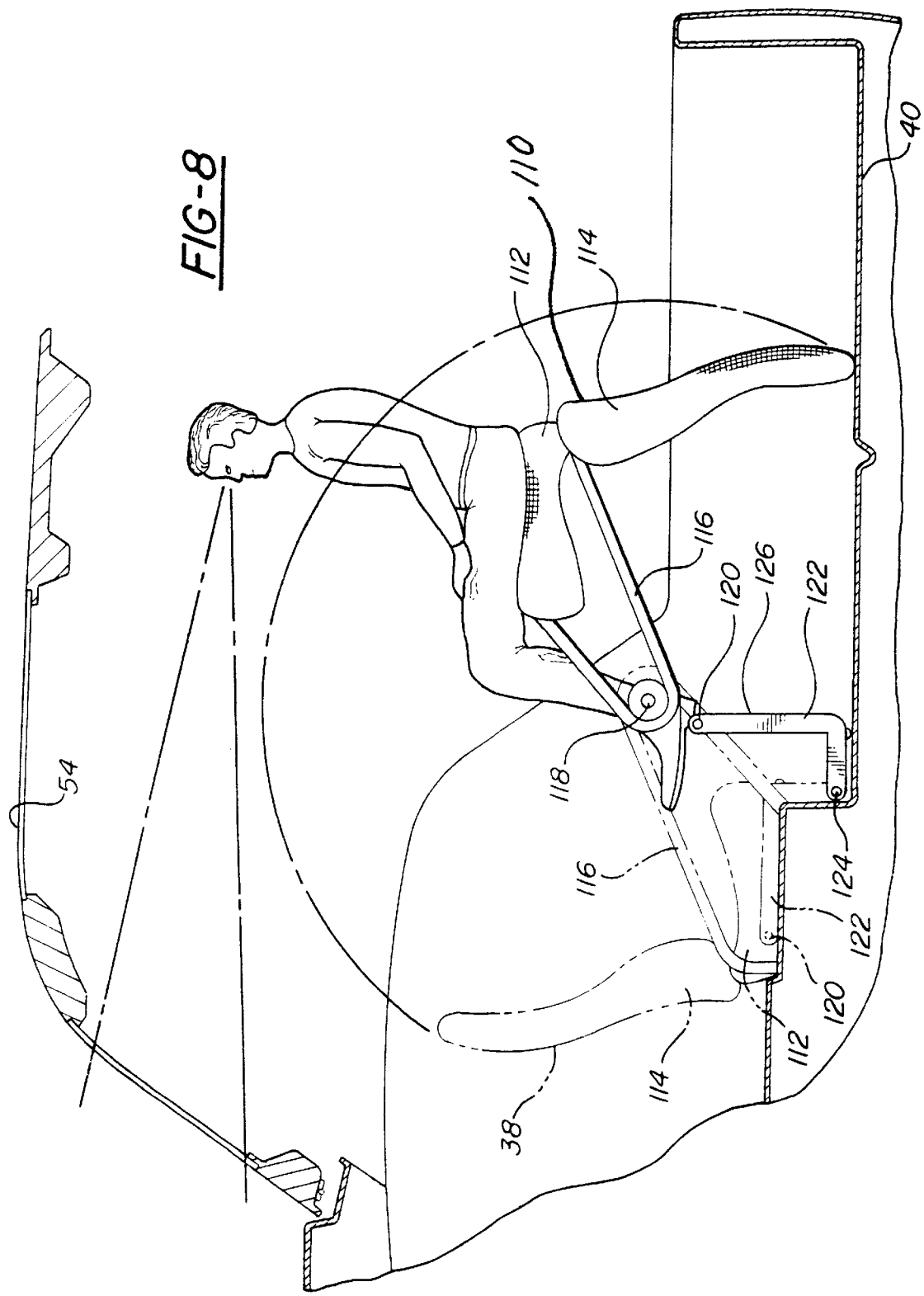

ained in the closed position an occupant can sit in the drivers seat and operate the vehicle, either on the land or on the water, while using the rear window in the rear leg. Moreover the closed hatch secures the occupant compartment from foul weather and rough seas while on the water and provides the same security as a typical motor vehicle on land. In addition the hatch and the deck together, with the hatch open or closed, provides multiple purpose usage as a motor vehicle for recreation or cargo on either land or water.

AMPHIBIOUS VEHICLE

TECHNICAL FIELD

The subject invention relates to an amphibious vehicle and, more particularly, to a combination of components that provide multiple purpose and function for both land and water use.

BACKGROUND OF THE INVENTION

Amphibious vehicles are known which can drive on land as well as in the water. Typically, these vehicles are of two general sorts. A first general sort is boat-like in general appearance and has no roof. These vehicles are of limited practicality as land vehicles, as they are not secure from theft, nor do they protect the operator from the environment.

A second general sort of amphibious vehicle utilizes a body that is not unlike a typical motor vehicle with a non-removable roof.

This type of vehicle has some disadvantages. In this type of vehicle the operator and passengers are typically limited to sitting in the same position whether the vehicle is moving on land or on the water. Also, the operators and passengers sit in a position which is undesirably low compared to the water level.

The prior amphibious vehicles do not have access to an open deck area and thus are not useful for activities such as fishing, hunting, diving and swimming. In addition they do not allow the occupants to stand or be out on an open deck.

In addition, prior vehicles lack deck space for hauling cargo and when in the water they lack freeboard or seaworthiness.

For the above reasons the known amphibious vehicles have some limitations.

SUMMARY OF THE INVENTION AND ADVANTAGES

An amphibious vehicle comprises a watertight body for floating on water with wheels for supporting the body for travel over land. The body defines an occupant compartment having a front with a land windshield, a rear with a rear window and a top extending between the front and the rear. Front, center, and rear seats are placed in the occupant compartment separated by a center aisle for access to the deck. The body includes a deck extending rearwardly from the occupant compartment to a rear end. The vehicle is characterized by the occupant compartment including a hatch extending from the top to the deck to define the rear of the compartment. The hatch is hinged to the top for movement between a closed position, closing the rear of the occupant compartment, and an open position, above the deck, to open the rear of the occupant compartment.

The subject invention offers several advantages over prior art amphibious vehicles. The open hatch provides room for a water vehicle operator to stand, and also allow access to the open air while on the water. The unique hatch is formed in an "L"-shape and includes a top leg forming a portion of the top of the vehicle and a rear leg forming the rear of the occupant compartment in the closed position. When in the open position the hatch allows occupants to have access to a deck outside of the vehicle where the rear leg forms a roof over the deck. The unique hatch also includes a rear window in the rear leg and a water windshield in the top leg. When the hatch is in the open position, an occupant can stand on the deck, or sit on a rotated seat and operate the vehicle while viewing through the water windshield. When the hatch

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a view similar to FIG. 1 but showing side curtains.

FIG. 8 shows a seat embodiment which may be introduced into this invention;

DETAILED DESCRIPTION OF THE PREFERRED EMBODIMENT

Figure 1:
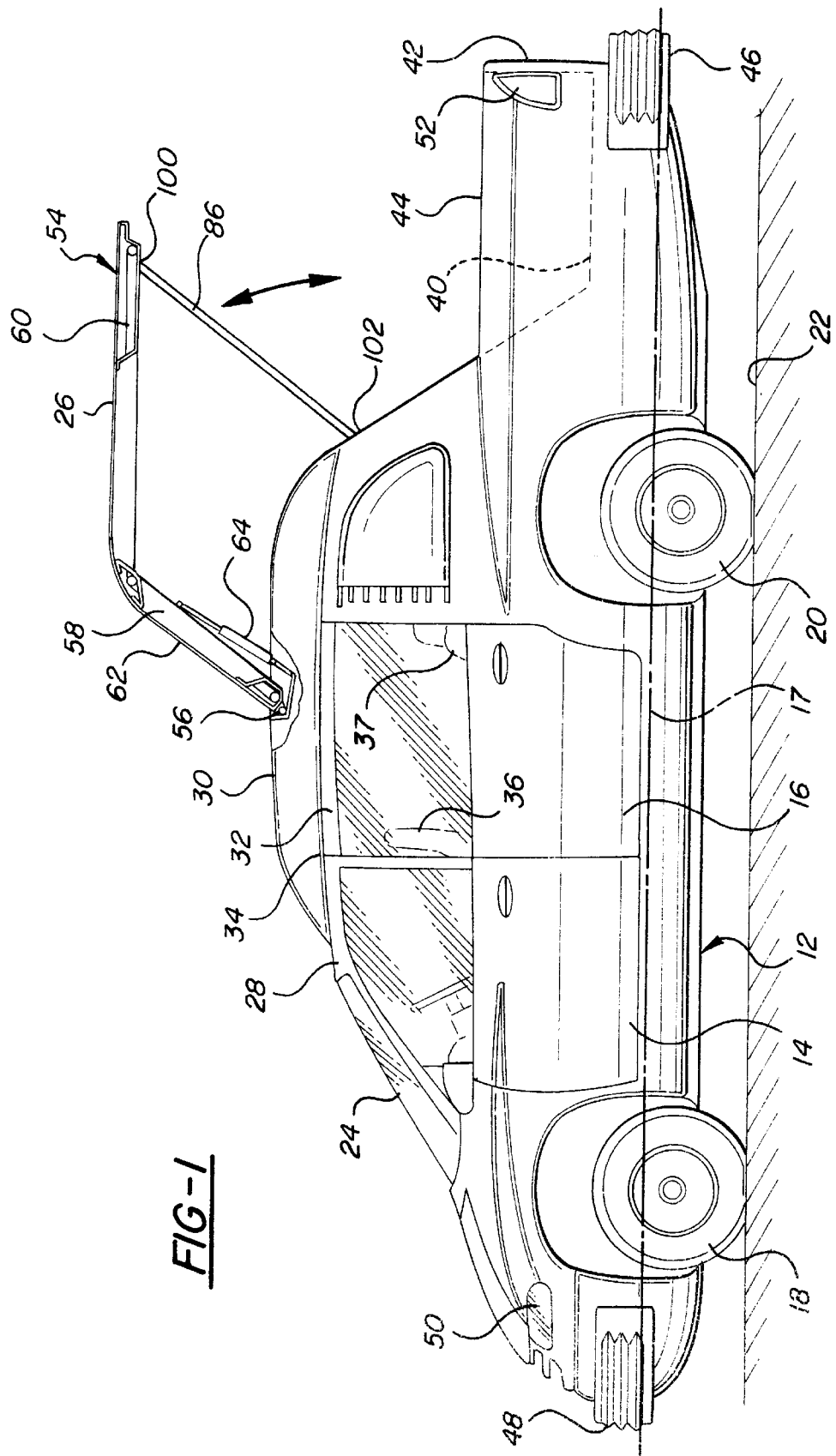
FIG. 1 is an elevational view partially broken away and in cross section of a preferred embodiment of the subject invention.
Figure 2:
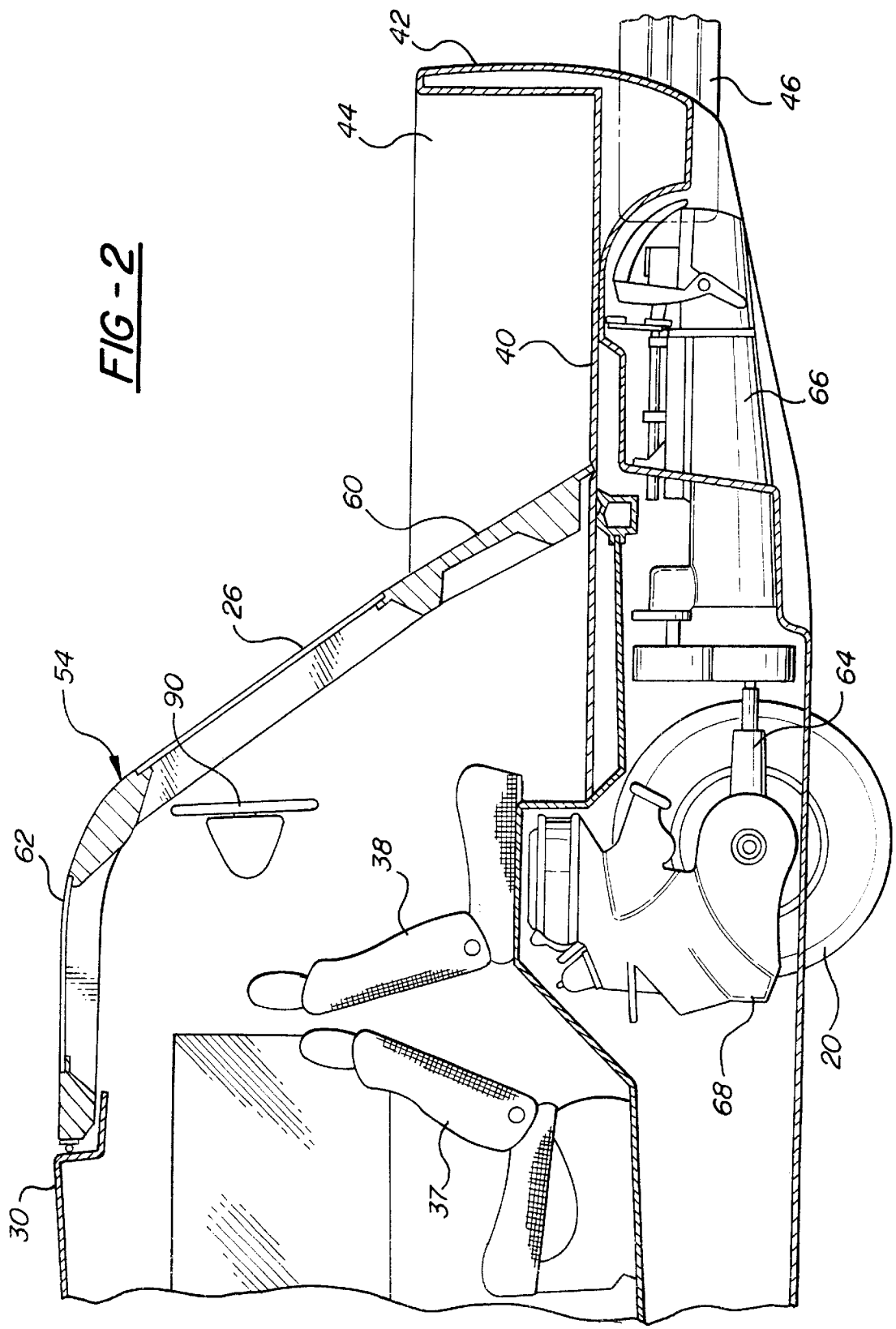
FIG. 2 is a partial elevational view similar to FIG. 1 but in cross section and the hatch in the closed position.

Referring to the Figures, wherein like numerals indicate like or corresponding parts throughout the several views, an amphibious vehicle is generally shown in FIGS. 1 and 2. The vehicle comprises a watertight body, generally indicated at 12, for floating on water. The watertight body prevents all water from entering the interior of the vehicle. The vehicle includes front 14 and rear 16 doors through which occupants can enter the interior of the vehicle for land or water use. The vehicle also features a water line 17 which is below the doors.

The vehicle also includes front 18 and rear 20 wheels for supporting the body 12 of the vehicle for travel over land 22. As is customary, the front wheels 18 are disposed on each side of the vehicle body 12 as are the rear wheels 20 disposed on each side of the vehicle body 12.

The body 12 defines an occupant compartment having a front with a land windshield 24, a rear with a rear window 26 and a top extending between the front and the rear. The top of the compartment comprises an original equipment top 28 and an auxiliary top 30 disposed on the original equipment top 28. The forward extremity of the original equipment top 28 is disposed rearwardly of the land windshield 24 and has sides 32. The auxiliary top 30 has sides 34 which are disposed inwardly of the sides 32 of the original equipment top 28 whereby the auxiliary top 30 is narrower than the original equipment top 32.

Figure 3:
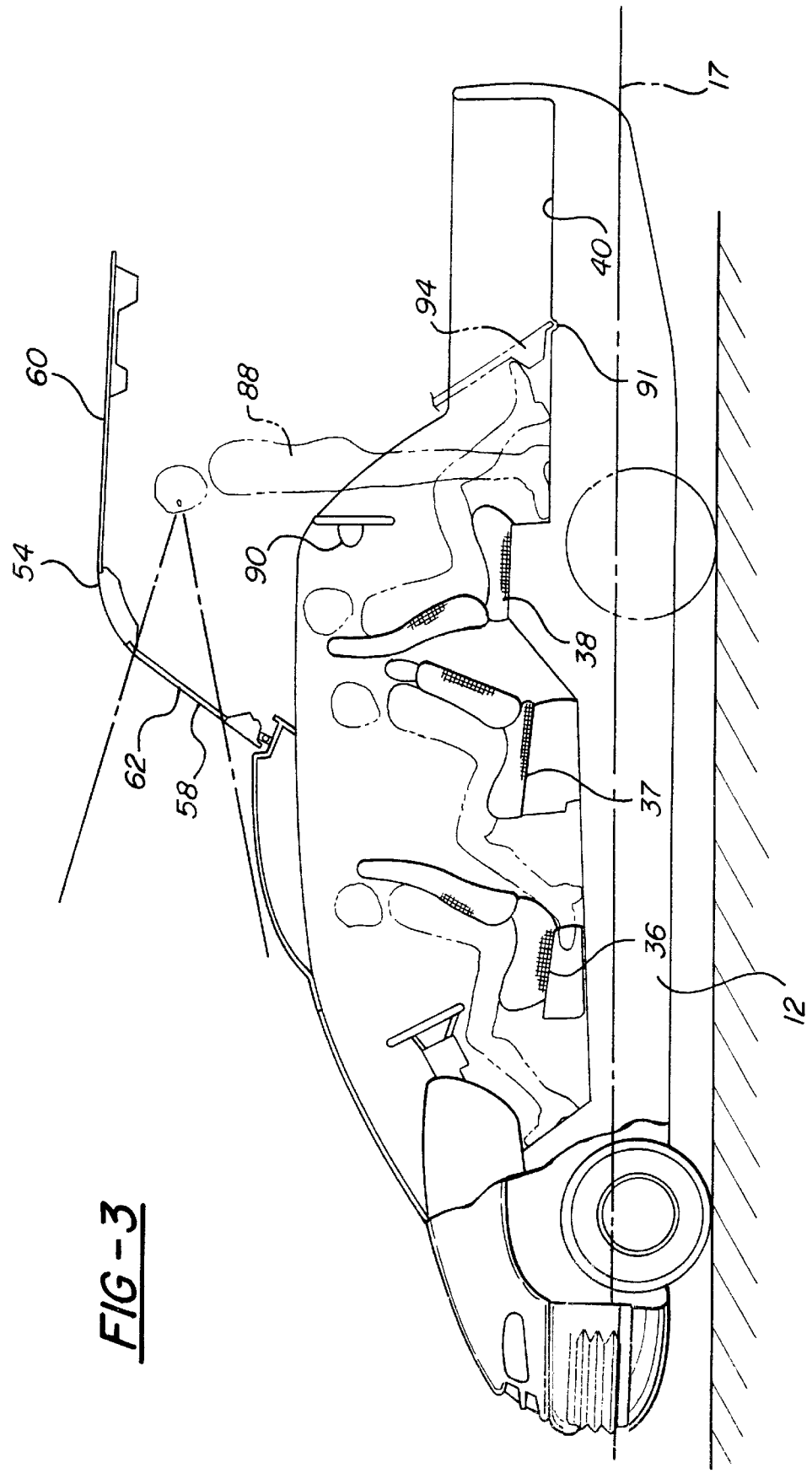
FIG. 3 is an elevational view similar to FIG. 1 but in cross section and showing occupants.

As shown in FIG. 3, three rows of seats 36, 37, 38 are disposed in the occupant compartment. Each row of seats 36, 37, 38 consists of a pair of seats located on opposite sides of a center aisle (not shown). This provides free access from the seats 36, 37, 38 to the deck 40. The second 37 and third 38 rows of seats are easily removed to enhance the utility of the vehicle. An alternative pivoting seat is shown in FIG. 8. Also shown in FIG. 3, is an occupant 88 standing on the deck 40 with the hatch 54 in the open position. The rear leg 60 serves as a roof and is disposed generally horizontally above the top. Top leg 58 extends upwardly from the top to the rear leg 60 whereby the occupant 88 operates the vehicle on water while viewing forwardly through the water windshield 62 and by utilizing a marine helm 90 to steer the vehicle. Helm 90 may fold to the side during land use. FIG. 3 also shows in a partial section the closed position 91 with the latch secured to the deck 40. A lock of known type preferably locks the latch at this position. Note a footrest 94 is provided in the closed position.

As best shown in FIG. 2, body 12 includes a deck 40 extending rearwardly from the occupant compartment to a rear end 42. The deck extends into the vehicle to the engine compartment, as described hereinafter. Walls 44 extend upwardly around the deck 40. An energy absorbing bumper 46 is disposed on the rear end 42 of the deck 40. In a similar fashion, an energy absorbing bumper 48 is disposed on the front of the vehicle body 12. As shown in FIG. 3, headlights 50 are disposed on the front end of the vehicle and rear tail lights 52 are disposed on the rear end 42 of the deck 40.

The vehicle is characterized by the occupant compartment including a hatch, generally indicated at 54 extending from the auxiliary top 30 to the deck 40 to define the rear of the occupant compartment. The hatch 54 is hinged by a hinge 56 to the auxiliary top 30 for movement between a closed position (FIG. 2) closing the rear of the occupant compartment and an open position (FIG. 1) above the deck 40 to open the rear of the occupant compartment and form the bridge. The hatch 54 is generally L-shaped having a top leg 58 forming a portion of the auxiliary top 30 and a rear leg 60 forming the rear of the occupant compartment in the closed position. In other words, the rear leg 60 forms the rear of the auxiliary top 30 as well as the rear of the original equipment top 28 and the rear of the occupant compartment in the closed position. The rear window 26 is disposed in the rear leg 60.

A water windshield 62 is disposed in the top leg 58. As illustrated in FIG. 1, the rear leg 60 is disposed generally horizontally above the auxiliary top 30 when in the open position. In the open position, the top leg 58 extends upwardly from the auxiliary top 30 to the rear leg 60 whereby an operator may stand on the deck 40 and operate the vehicle on water while viewing forwardly through the water windshield 62. A lift device 64, such as a gas spring, holds the hatch 54 in the open position. The hatch 54 extends below the rear window 26 and below the upper extremity of the deck walls 44 and down to the deck 40 when in the closed position.

Accordingly, the hatch 54 has the multi-purpose and function to serve both as a top over the deck 40 and a windshield for marine use when in the open position. The geometry of the hatch 54 enhances the multiple purpose, multiple function, and utility of the vehicle.

The rear wheels 20 are disposed below the deck 40 and on each side of the vehicle. A water jet propulsion unit 66 is disposed beneath the deck 40 between the rear wheels 20 and the rear end 42 of the deck 40. In addition, a power plant 68 is disposed between the rear wheels 20. The power plant 68 includes an engine with a power transmission including a power take off 64.

Figure 5A:
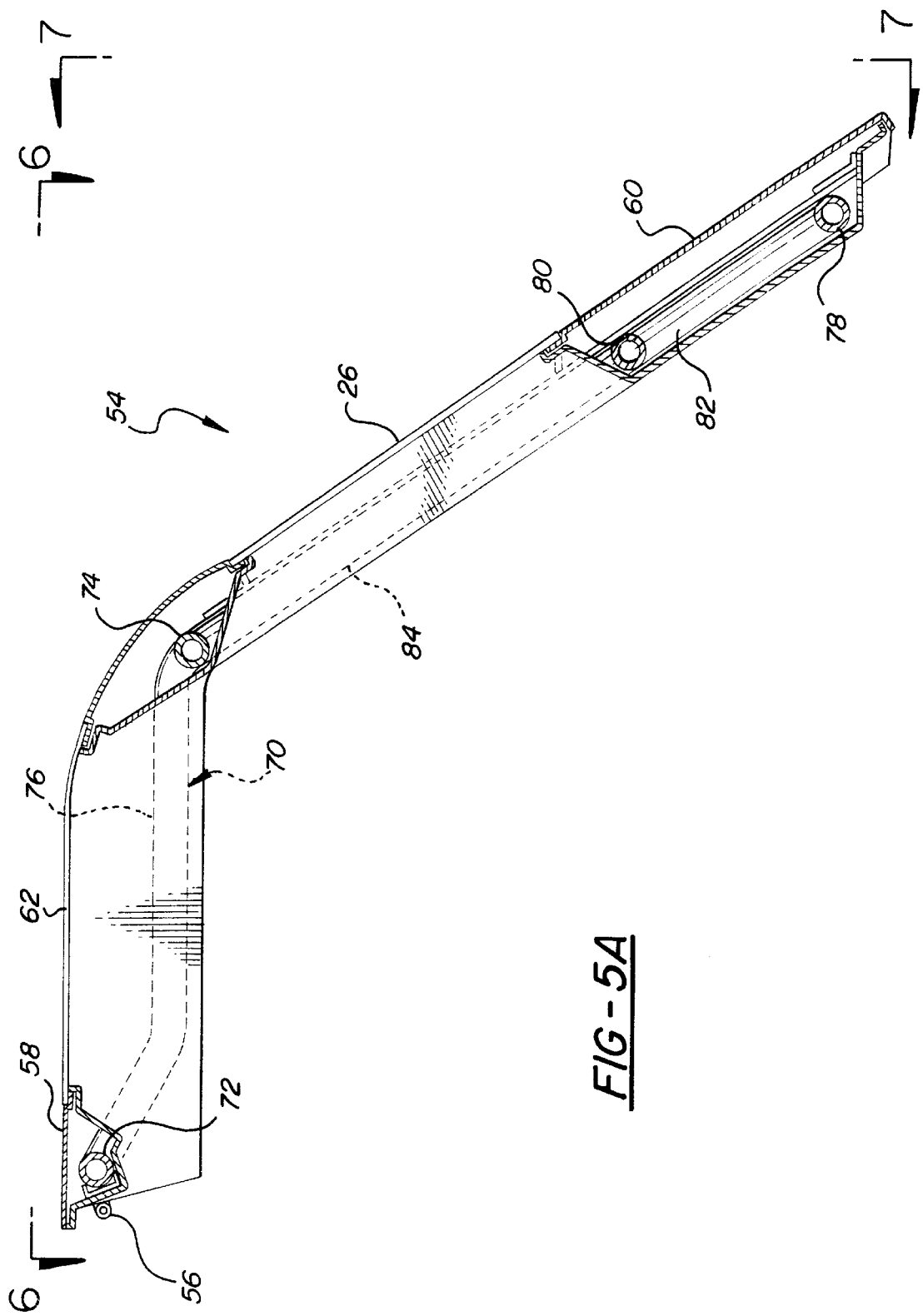
FIG. 5A is a cross sectional view longitudinally through a preferred embodiment of the hatch of the subject invention.
Figure 6:
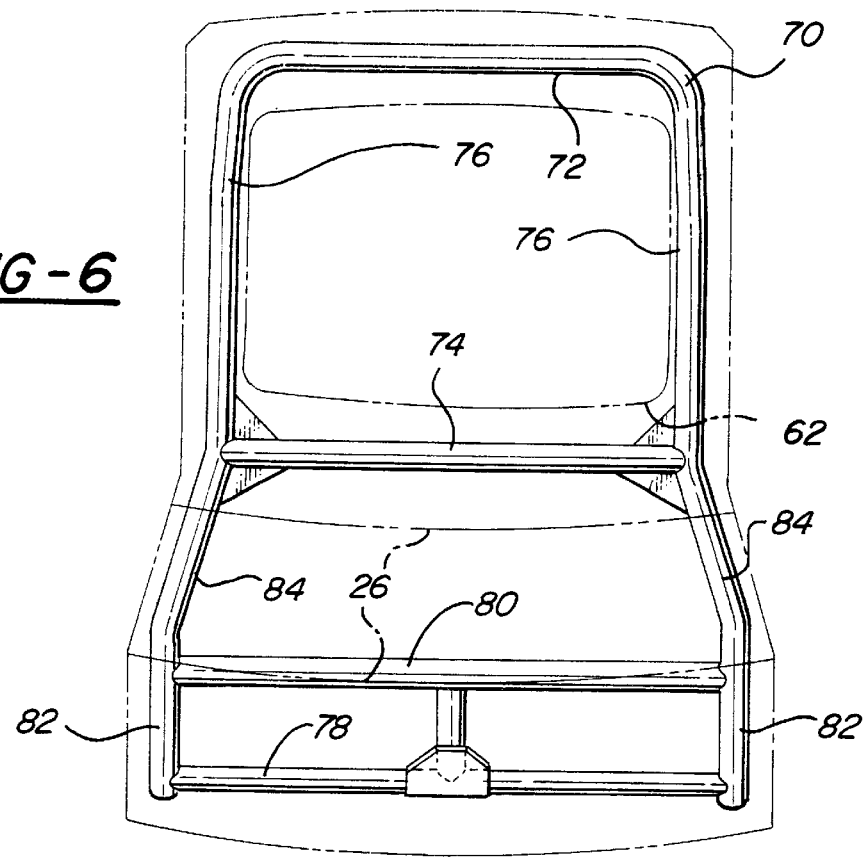
FIG. 6 is a top view of the hatch taken along line 6—6 of FIG. 5A.
Figure 7:
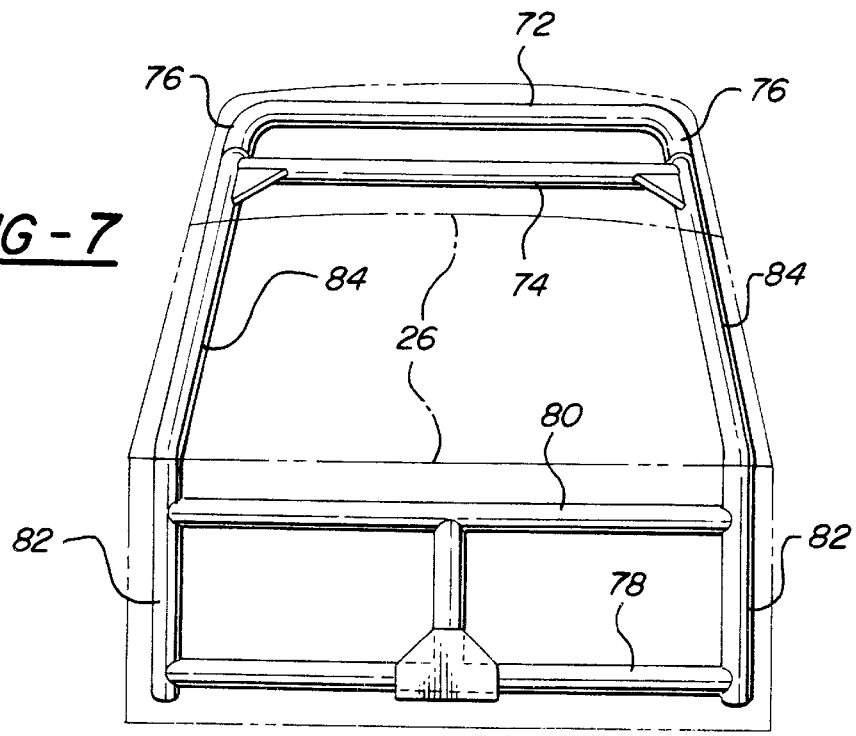
FIG. 7 is a rear view of the hatch taken along line 7—7 of FIG. 5A.

FIG. 5A shows the hatch in cross section with the internal tubular framework, generally indicated at 70. The tubular framework can also be understood from FIGS. 6 and 7. The tubular framework 70 supports the outer and inner skin along with the rear window 26 and the water windshield 62. The framework 70 includes an upper horizontal cross member 72 connected to an intermediate cross member 74 by parallel side members 76 to define an upper rectangle. A lower rectangle is defined by a bottom cross member 78 connected to rear window support cross member 80 by parallel side members 82. The upper frame, and therefore the intermediate cross member 74 of the upper rectangular frame, is narrower than the lower frame, i.e., the rear window cross member 80 thereof. Consequently, the two rectangular frames are connected together by converging side members 84 which converge toward one another from the wider lower frame to the narrower upper frame. As will be appreciated, all of the side members may be constructed of one continuous tubular member bent into a generally U-shape. The cross members 74, 78 and 80 extend between the legs of the U-shape.

As shown in FIG. 1, prop rods 86 support the hatch 54 in the open position to prevent bouncing of the hatch 54 due to wave action or lifting of the hatch 54 as a result of wind gusts. Additionally as shown in FIG. 4, the prop rods 86 support side curtains 92 which can be used to enclose the deck 40. The curtains 92 can be used on the water to protect occupants 88 from the weather or can be used on land when the occupants 88 use the vehicle for camping.

Figure 5B:
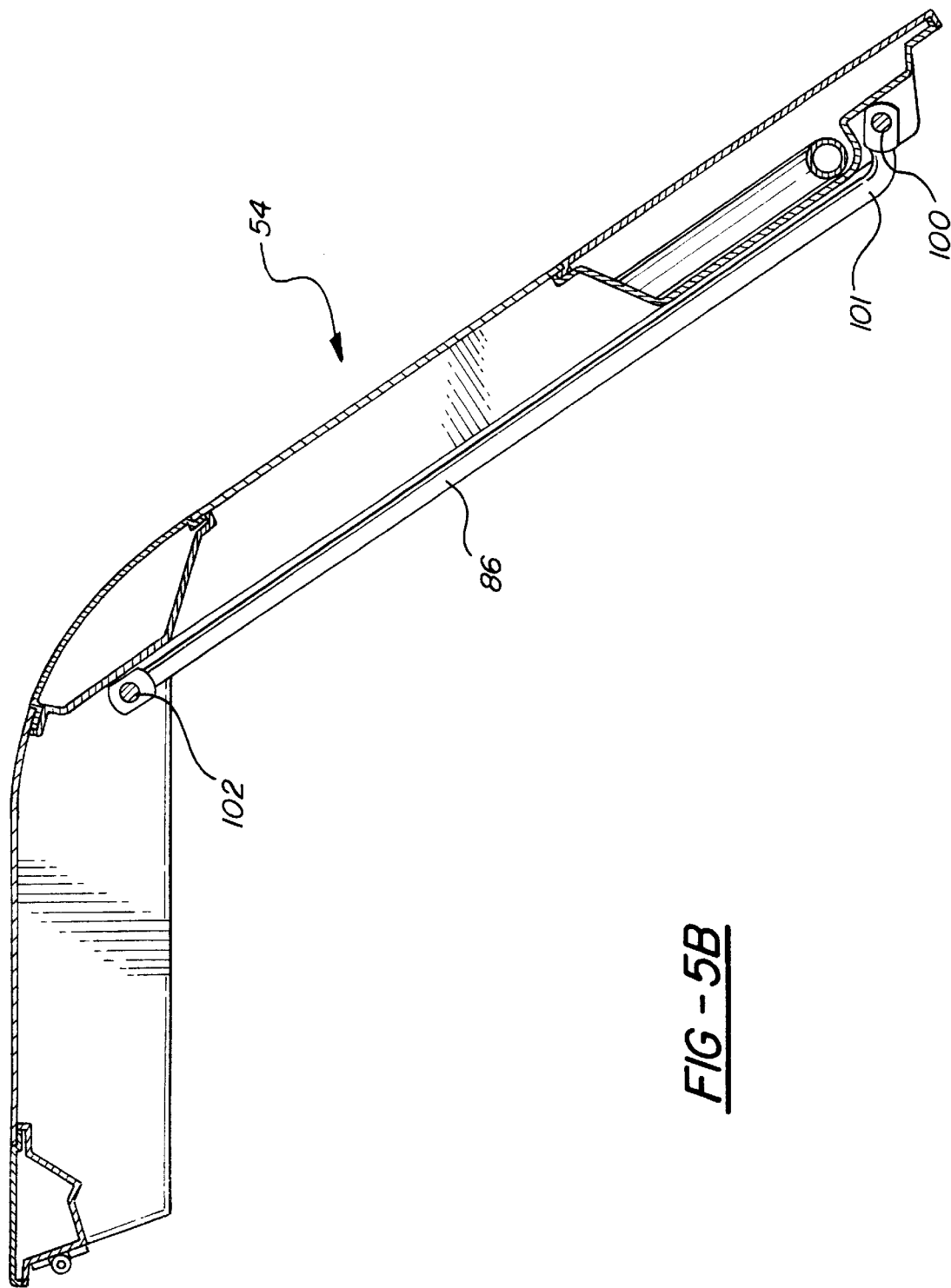
FIG. 5B is a view similar to FIG. 5A, but showing one further feature.

FIG. 5B shows a detail of the prop rods 86 in the stored position. As shown, there is a hinge axis 100 wherein the prop rod 86 is pivotally attached to the hatch 54. The other end 102 is shown fixed to the hatch 54 in the stored position. When the hatch 54 is in the open position the prop rods 86 may be pivoted on the axis 100 so that the other end 102 can be fixed to the vehicle body in the position shown in FIG. 1. This connection is now shown. In this position the prop rods 86 provide support and secures the hatch 54 in the open position. And elbow in the prop rods 86 provides the geometry for proper positioning in the stored position.

FIG. 8 shows a second embodiment for the rear seat 38. As shown, the rear seat 38 can be rotated to a position as shown at 110 allowing the operator to sit and operate the vehicle from the bridge.

The rear seat 38 includes a seat 112 and a seat back 114. The rear seat 38 is mounted on the frame 116 and has a pivot axis 118, with the pivot axis 118 being mounted in the side of the vehicle. The operator may now sit on the lower surface of the seat 112 while it is supported from the deck 40 by the seat back 114.

A further enhancement of this embodiment is a pivotal foot rest 120. As shown, the foot rest 120 is mounted on a frame 122 with a pivot axis at 124. When the foot rest 120 is rotated rearward to a position 126 such that the frame 122 rests on the deck 40 it supports the operator's feet. When not in use the footrest 120 is rotated forward to the stored position under the rear seat 38.

This inventive seat embodiment allows the practical application of a seat which is used in a conventional manner for road use, but yet provides the operator with a comfortable seat and footrest when the operator is at the helm on the bridge.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An amphibious vehicle comprising:
   a watertight body (12) for floating on water;
   wheels (18, 20) for supporting said body (12) for travel over land (22);
   said body (12) defining an occupant compartment having a front with a land windshield (24), a rear with a rear window (26) and a top extending between said front and said rear;
   at least one seat (36, 38) in said occupant compartment;
   said body (12) including a deck (40) extending rearwardly form said occupant compartment to a rear end, said deck being positioned vertically lower than said seat;
   said vehicle characterized by said occupant compartment including a hatch (54) extending from said top to said deck (40) to define the rear of said compartment and hinged to said top for movement between a closed position closing said rear of said occupant compartment and an open position above said deck (40) to open said rear of said occupant compartment.

2. An amphibious vehicle as set forth in claim 1 including a lift device (64) for opening and holding said hatch (54) in said open position.

3. An amphibious vehicle as set forth in claim 1 wherein said hatch (54) includes a foot rest (94) for use when said hatch (54) is in said closed position.

4. An amphibious vehicle comprising:
   a watertight body (12) for floating on water;
   wheels (18, 20) for supporting said body (12) for travel over land (22);
   said body (12) defining an occupant compartment having a front with a land windshield (24), a rear with a rear window (26) and a top extending between said front and said rear;
   at least one seat (36, 38) in said occupant compartment;
   said body (12) including a deck (40) extending rearwardly form said occupant compartment to a rear end;
   said vehicle characterized by said occupant compartment including a hatch (54) extending from said top to said deck (40) to define the rear of said compartment and hinged to said top for movement between a closed position closing said rear of said occupant compartment and an open position above said deck (40) to open said rear of said occupant compartment, wherein said hatch (54) is generally L-shaped having a top leg (58) forming a portion of said top and a rear leg (60) forming said rear of said occupant compartment in said closed position.

5. An amphibious vehicle as set forth in claim 4 wherein said rear window (26) is disposed in said rear leg (60).

6. An amphibious vehicle as set forth in claim 5 including a water windshield (62) disposed in said top leg (58).

7. An amphibious vehicle as set forth in claim 6 wherein said rear leg (60) is disposed generally horizontally above said top when in said open position with said top leg (58) extending upwardly from said top to said rear leg (60) whereby an operator may stand on said deck (40) and operate said vehicle on water while viewing forwardly through said water windshield (62).

8. An amphibious vehicle as set forth in claim 7 wherein said rear leg (60) acts as a roof over said deck (40) whereby an operator may stand on said deck (40) under said rear leg (60) and operate said vehicle on water while viewing forwardly through said water windshield (62).

9. An amphibious vehicle as set forth in claim 7 including prop rods (86) extending from said body (12) to said top leg (60) for locking said hatch (54) in said open position.

10. An amphibious vehicle as set forth in claim 9 wherein said hatch (54) includes means for storing said prop rods (86) when said hatch (54) is in said closed position.

11. An amphibious vehicle as set forth in claim 9 including curtains (92) supported by said prop rods (86) for enclosing said deck (40).

12. An amphibious vehicle as set forth in claim 7 wherein said hatch (54) extends below said rear window (26) to said deck (40) when in said closed position.

13. An amphibious vehicle as set forth in claim 7 including walls (44) extending upwardly around said deck (40), and wherein said hatch (54) extends below said rear window (26) and below the upper extremity of said walls (44) to said deck (40) when in said closed position.

14. An amphibious vehicle as set forth in claim 12 wherein said wheels (18, 20) include rear wheels (20) disposed below said deck (40) and on each side of said vehicle.

15. An amphibious vehicle as set forth in claim 13 including a water jet propulsion unit (66) disposed beneath said deck (40) between said rear wheels (20) and said rear end of said deck (40).

16. An amphibious vehicle as set forth in claim 15 including a power plant (68) disposed between said rear wheels (20).

17. An amphibious vehicle as set forth in claim 25 wherein a pivoting footrest (120) is also stowed in an out of use position beneath said pivoting seat (38) when the vehicle is on land, but may be pivoted from that position to a used position (126) when said seat (38) is pivoted to the position where it is used when the vehicle is on water.

18. An amphibious vehicle comprising:
   a watertight body (12) for floating on water;
   wheels (18, 20) for supporting said body (12) for travel over land (22):
   said body (12) defining an occupant compartment having a front with a land windshield (24), a rear with a rear window (26) and a top extending between said front and said rear wherein said top of said compartment is comprised of an original equipment top (28) and an auxiliary top (30) disposed on said original equipment top (28), said forward extremity of said original equipment top (28) being disposed rearwardly of said land windshield (24);
   at least one seat (36, 38) in said occupant compartment:
   said body (12) including a deck (40) extending rearwardly form said occupant compartment to a rear end; and
   said vehicle including a hatch (54) extending from said top to said deck (40) to define the rear of said compartment and hinged to said top for movement between a closed position closing said rear of said occupant compartment and an open position above said deck (40) to open said rear of said occupant compartment, said hatch (54) being pivotally supported (56) by said auxiliary top (30).

19. An amphibious vehicle as set forth in claim 18 wherein said hatch (54) is generally L-shaped having a top leg (58) forming a portion of said auxiliary top (30) and a rear leg (60) forming said rear of said auxiliary top (30) and original equipment top sides (32) and said rear of said occupant compartment in said closed position.

20. An amphibious vehicle as set forth in claim 19 wherein said hatch (54) extends below said rear window (26) to said deck (40) when in said closed position.

21. An amphibious vehicle as set forth in claim 19 including walls (44) extending upwardly around said deck (40), and wherein said hatch (54) extends below said rear window (26) and below the upper extremity of said walls (44) to said deck (40) when in said closed position.

22. An amphibious vehicle as set forth in claim 20 including a water propulsion unit (66) disposed beneath said deck (40) between said rear wheels (20) and said rear end of said deck (40).

23. An amphibious vehicle as set forth in claim 22 including a power plant (68) disposed between said rear wheels (20).

24. An amphibious vehicle as set forth in claim 23 wherein said original equipment top (28) has sides (32) and said auxiliary top (30) has sides (34), said sides (34) of said auxiliary top (30) being disposed inwardly of said sides (32) of said original equipment top (28) whereby said auxiliary top (30) is narrower than said original equipment top (32).

25. An amphibious vehicle as set forth in claim 6 wherein a rear seat (38) in the vehicle can rotate between a position (110) whereby it allows an operator to sit when the vehicle is on water while viewing forward through said water windshield (62), and to a lower position wherein it provides a rear seat (38) when the vehicle is on land.

* * * * *